(12) United States Patent
Pripps (10) Patent No.: US 11,828,495 B1
(45) Date of Patent: Nov. 28, 2023

(54) SOLAR ENERGY COLLECTOR AND POWER GENERATION SYSTEM

(71) Applicant: Steven Robert Pripps, Winchester, CA (US)

(72) Inventor: Steven Robert Pripps, Winchester, CA (US)

( * ) Notice: Subject to any disclaimer, the term of this patent is extended or adjusted under 35 U.S.C. 154(b) by 0 days.

(21) Appl. No.: 18/106,863

(22) Filed: Feb. 7, 2023

(51) Int. Cl.
| | |
|---|---|
| *F24S 30/45* | (2018.01) |
| *F02G 1/00* | (2006.01) |
| *F03G 6/00* | (2006.01) |
| *F24S 23/71* | (2018.01) |
| *F24S 60/00* | (2018.01) |
| *F24S 23/79* | (2018.01) |
| *F03G 6/06* | (2006.01) |
| *F24S 20/25* | (2018.01) |

(52) U.S. Cl.
CPC .......... *F24S 30/45* (2018.05); *F02G 1/00* (2013.01); *F03G 6/0055* (2021.08); *F03G 6/068* (2013.01); *F03G 6/071* (2021.08); *F24S 20/25* (2018.05); *F24S 23/71* (2018.05); *F24S 23/79* (2018.05); *F24S 60/00* (2018.05); *F02G 2254/30* (2013.01); *Y02E 10/46* (2013.01)

(58) Field of Classification Search
CPC ..... Y02E 10/40–47; F24S 23/71; F24S 23/79; F24S 10/40; F24S 10/45; F24S 20/20–25
See application file for complete search history.

(56) References Cited

U.S. PATENT DOCUMENTS

| | | | |
|---|---|---|---|
| 1,969,839 A | 8/1934 | Goddard | |
| 4,501,262 A * | 2/1985 | Lyon | F24D 17/0021 126/640 |
| 6,735,946 B1 | 5/2004 | Otting | |
| 7,026,722 B1 | 4/2006 | Otting | |
| 7,051,529 B2 | 5/2006 | Murphy | |
| 7,607,428 B2 | 10/2009 | Riffelmann | |
| 8,418,464 B2 | 4/2013 | Soo | |
| 8,464,535 B2 | 6/2013 | White | |
| 2009/0320830 A1 * | 12/2009 | Bennett | F24S 23/71 126/684 |
| 2011/0162362 A1 * | 7/2011 | Steiner | F03G 6/00 60/516 |

FOREIGN PATENT DOCUMENTS

| | | | |
|---|---|---|---|
| CN | 106837719 A | * | 6/2017 |
| EP | 2 318 776 B1 | | 5/2013 |
| KR | 20120067385 A | * | 6/2012 |

* cited by examiner

*Primary Examiner* — Laert Dounis (57) ABSTRACT

The present disclosure solves the problem of solar energy capture and storage for solar power generating devices. This power system does not rely on batteries to accomplish energy generation during nighttime operating hours or during cloudy days. Solar energy is collected in a chamber equipped with opposing parabolic mirrors and a gaseous medium. The solar energy collector traps the majority of incoming sunlight and, through the processes of thermal radiation, heat conduction, and heat convection, converts said sunlight into useable heat energy. The heated gaseous medium is pumped to a Stirling engine for the purpose of conversion to mechanical power.

15 Claims, 14 Drawing Sheets

SOLAR ENERGY COLLECTOR AND POWER GENERATION SYSTEM

TECHNICAL FIELD

The present disclosure relates to the capture and storage of solar energy. The captured solar energy is converted to mechanical power by passing solar heated gas through the heat exchanger of a Stirling Engine.

BACKGROUND

Three main classes of solar energy systems are currently in use. They are: 1.) photovoltaic panels, 2.) thermo solar collectors and 3.) concentrated solar power systems.

Photovoltaic panels are expensive and the efficiency of their energy conversion is still quite low. They do not produce electrical energy during nighttime hours and rely on batteries to store electrical power for that purpose.

Thermo solar collectors heat a large quantity of liquid, typically water, that is contained in tubes. The thermal inertia of thermo solar collectors is quite high and they are slow to achieve any great heat. For this reason, they are mostly used for domestic warm water supply. They can also be used for preheating water which is later brought to higher temperatures with other means.

Concentrated solar power systems are suitable for large scale power generation plants. These systems are arranged to focus sunlight collected from a large area onto a smaller area. Solar troughs, solar dishes and solar towers are included in this category.

An example of a solar dish is a Stirling Engine that is powered by sunlight focused directly onto its heat exchanger by a parabolic mirror. Another similar example is a large parabolic mirror focusing sunlight onto a small parabolic mirror which then directs the sunlight through a slit in the large parabolic mirror in the manner of a Cassegrain or Gregorian telescope; the light then transferring its energy to a device that generates mechanical and electrical power. The shortcoming of these designs is that neither generates power after the sun goes down.

A solar tower receives focused sunlight reflected off of an array of flat, movable mirrors. Commercial designs using molten salts as the working fluids are now in operation. These working fluids have high heat capacity which can be used to store solar energy before using it to boil water to drive turbines. These designs thus allow power to be generated after the sun sets. The shortcoming of these designs is that they do not produce electricity at a competitive price. Yet another shortcoming is that such large area solar concentrating installations can incinerate birds that fly over them.

The solar trough system of solar light concentration is a parabolic trough that is straight in one dimension, curved as a parabola in the other two and lined with a polished metal mirror. The sunlight is focused along a straight tube made from various components and coatings. Hot fluid running through the tube is piped to heat engines to drive machinery or generate electricity. Solar troughs have also been constructed to commercial scale. However, as with the solar towers, they cannot provide energy at a cost competitive with conventional fossil energy sources. As with the aforementioned examples, solar troughs do not produce power after the sun sets.

It can be seen that the current state of solar power technology is lacking in either 1.) providing power at a price competitive with traditional technology and/or 2.) does not produce power 24 hours every day.

PRIOR ART

The following is a tabulation of some prior art that presently appears relevant:

| U.S. patents | | | |
|---|---|---|---|
| Pat. Nos. | Kind Code | Issue Date | Patentee |
| 1,969,839 | A | 1934 Aug. 14 | Goddard |
| 4,554,908 | A | 1985 Nov. 26 | Hanlet |
| 5,653,222 | A | 1997 Aug. 5 | Newman |
| 6,735,946 | B1 | 2004 May 18 | Otting |
| 7,051,529 | B2 | 2006 Jun. 30 | Murphy |
| 7,607,428 | B2 | 2009 Oct. 27 | Riffelmann |
| 7,823,381 | B2 | 2010 Nov. 2 | Misselhorn |
| 8,418,464 | B2 | 2013 Apr. 16 | Soo |
| 8,464,535 | B2 | 2013 Jun. 18 | White |
| 8,783,246 | B2 | 2014 Jul. 22 | Cheng |
| 8,915,244 | B2 | 2014 Dec. 23 | von Behrens |
| 10,584,900 | B2 | 2020 Mar. 10 | von Behrens |
| 11,073,305 | B2 | 2021 Jul. 27 | Camfield |

Patents awarded for new methods to harness solar energy are numerous indeed. Perhaps the most recognizable name of the many inventors is Dr. Robert Goddard, "the father of modern rocketry", who was awarded U.S. Pat. No. 1,969,839, "Apparatus for Absorbing Solar Energy", for his work in the 1930's. Goddard described a conical tube that would focus the sun's rays to produce a rapid and complete vaporization of a liquid with a minimum loss of heat during the vaporization process.

In addition to aerospace pioneer Goddard, aerospace corporations Boeing, United Technologies and Aerojet Rocketdyne are amongst the many assignees; Boeing being assigned U.S. Pat. No. 6,735,946 which teaches the use of a parabolic mirror to focus sunlight directly onto the cavity of a Stirling Engine absorption chamber; United Technologies assigned U.S. Pat. No. 7,051,529 which describes how solar energy may be converted to molten salt and transported to a heat conversion system; and Aerojet Rocketdyne assigned U.S. Pat. No. 8,783,246 which teaches a solar trough system focusing sunlight on a metal conduit inside a glass container and coated with at least one element from a selection of silicon, titanium, aluminum, barium, and samarium.

The solar trough system of solar light concentration is a parabolic trough that is straight in one dimension, curved as a parabola in the other two and lined with a polished metal mirror. The sunlight is focused along a straight tube made from various components and coatings. Hot fluid running through the tube is piped to heat engines to drive machinery or generate electricity. A variation on this theme is described by U.S. Pat. No. 7,607,428 which teaches an absorbing coating of one kind on the solar side of the tube and an absorbing coating of another kind on the reflected side of the tube. A solar trough featuring multiple movable Fresnel facets that receive sunlight over a two dimensional space and concentrate the sunlight into a significantly smaller focal point in one dimension is taught by U.S. Pat. No. 10,584,900. A solar trough coupled to suspension members that selectively rotate about a focal line to concentrate the solar radiation at the focal line is described by U.S. Pat. No. 8,915,244.

The problem of energy storage for nighttime and cloudy day operations is addressed by U.S. Pat. No. 8,464,535 which teaches a containment vessel having a heat receiving region and a heat transfer region such that a plurality of phase change materials are disposed therein and a sequence of solid, liquid and vapor phases are used to transfer heat from a source to a heat receiver of a power conversion unit. A similar approach is used by U.S. Pat. No. 7,823,381 which teaches six changes of state and features several heat exchangers with a pipe connecting each to a working cylinder.

Flat plate sun light collectors comprise a sheet of glass disposed above a flat plate made from solar energy absorbing material. Tubing is arranged in serpentine form and placed in close contact with the heat absorbing surface. Gas or liquid is circulated through the tubing to transfer the heat of the sun to the heat exchange fluid. The heated fluid is then used to heat a home hot water supply or a swimming pool. U.S. Pat. No. 4,554,908 teaches the addition of grooves and coatings on the heat exchanger tubes to optimize sunlight that is oblique and not directly overhead. The gas medium recommended by U.S. Pat. No. 11,073,305 includes at least one hydro-fluoro-ether; also included are at least two thermal storage systems containing different phase change materials. U.S. Pat. No. 5,653,222 teaches the configuration of the rear housing of the solar collector to be comprised of a number of linear cells semi-circular in cross-section, each cell containing a fin-tube collector so as to optimize the inbound solar radiation and reduce outbound radiation losses.

The novel technology presented in United States Patents is by no means limited to laboratory experiments and prototypes. Large scale energy production is seen on rooftops and solar fields all over the world. Parabolic trough technology is featured in the 354 mW SEGS plant in California, the 280 mW Solana Generating Station in Arizona and the 200 mW Solaben Solar Power Station in Spain. The tower and heliostat mirror method is found in the 121 mW Ashalim Power Station in Israel and the 377 mW Ivanpah Solar Power Facility in Nevada. The Dish Stirling approach, that is, a Stirling engine affixed to the focal point of a large parabolic mirror, is featured in the 709 mW Imperial Valley Solar Project and the 850 mW Calico Solar Energy Project, both in California.

Photovoltaic power plants are the most ubiquitous of all. Photovoltaic units can be found on millions of rooftops all over the United States. Major photovoltaic power facilities of 800 mW or more can be found in China, India, Vietnam, Egypt and the United States.

It can be seen that much effort has been put into the research, development and production of solar power. And yet, for all this effort, it cannot be said that a viable replacement for nuclear energy or fossil fuel energy has been found. Of the examples given, none can provide 24 hour on demand electricity at a price competitive with traditional power generation stations. Some of these examples have proved so inefficient they have been cancelled. The reason for this is plain: the delivery of reliable, on demand solar energy has not been shown to be possible without overly complex machinery, overly complex phase change storage systems or highly expensive batteries.

The present embodiment solves these problems.

BRIEF SUMMARY

This embodiment does not rely on batteries to accomplish energy generation during nighttime operating hours or during cloudy days. Solar energy is collected in a chamber equipped with opposing parabolic mirrors and a supply of working gas. The solar heat collected transfers directly into a storage tank by means of convection and conduction. The heated working gas is pumped to a Stirling Engine for the purpose of conversion to mechanical power. The devices described in this embodiment are either Commercial-Off-the-Shelf or easily manufactured. The power generation system is scalable; it can be scaled down to power a single homestead or scaled up to power a major metropolitan area.

DRAWINGS—REFERENCE NUMERALS

44—chamber
46—outer transparent pane
48—inner transparent pane
50—large parabolic mirror
52—small parabolic mirror
54—cold block
56—wheeled trucks
Solar Energy Collector and Power Generation Systems 100, 200 and 300:

| Component | System 100 | System 200 | System 300 |
|---|---|---|---|
| solar energy collector | 120 | 220 | 320 |
| storage tank | 122 | 222 | 322 |
| duct | 124 | 224 | 324 |
| valve | 132 | 232 | 332 |
| dual axis mount | 134 | 234 | 334 |
| hot gas line | 136 | 236 | 336 |
| hot gas valve | 138 | 238 | 338 |
| cold gas line | 140 | 240 | 340 |
| cold gas valve | 142 | 242 | 342 |
| thermal barrier | 154 | 254 | 354 |

426—pump
428—Stirling engine
430—power generating device
436—hot gas line
440—cold gas line
442—cold gas valve
444—cold gas valve
446—4-way valve

DETAILED DESCRIPTION

Figure 1:
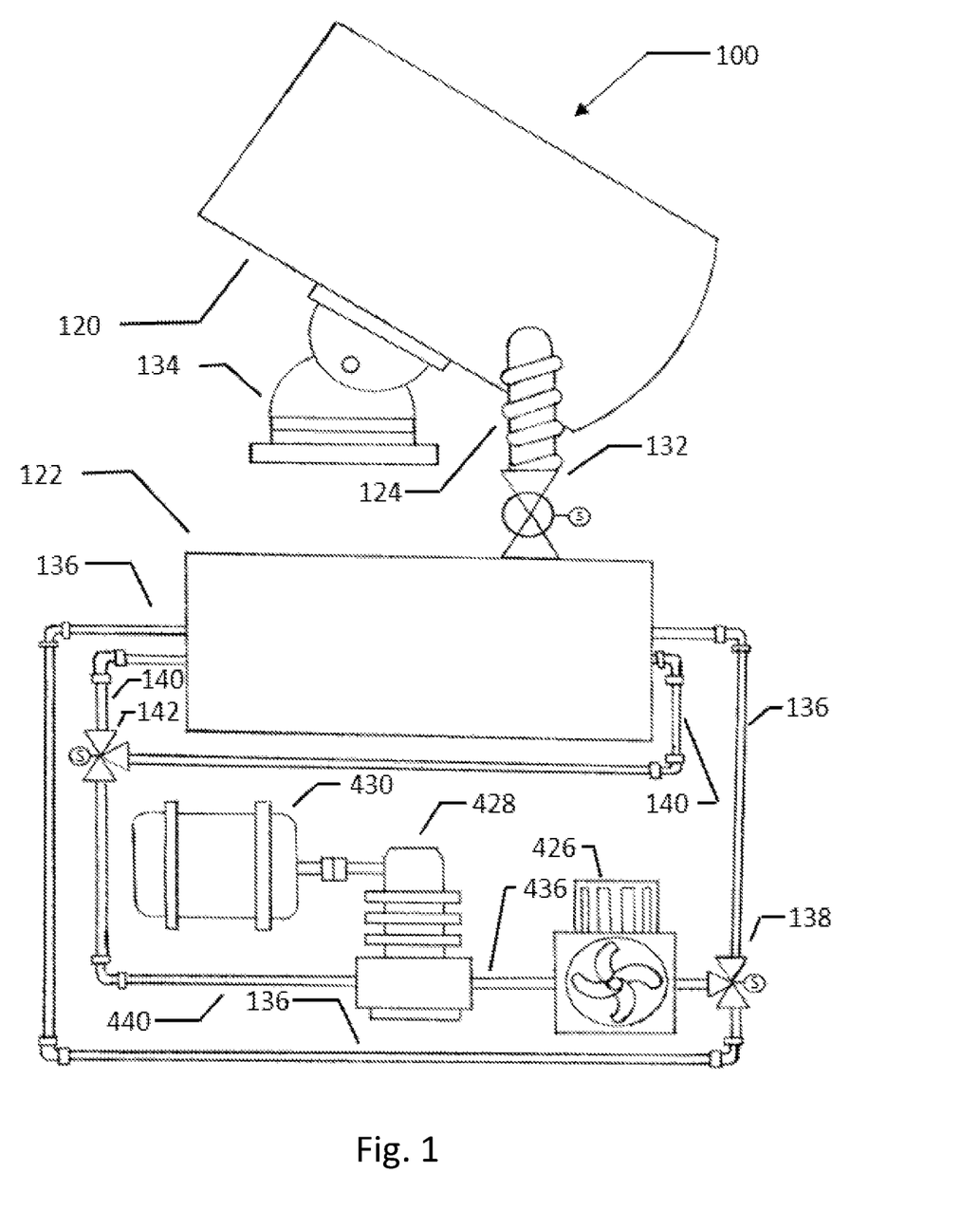
FIG. 1 is a side view of the Solar Energy Collector and Power Generation System.

Referring now to FIG. 1 there is shown a system overview of a solar energy collector and power generation system 100 according to an illustrative embodiment. Said solar energy collector and power generation system 100 comprises a solar energy collector 120, a storage tank 122, a pump 426, a Stirling engine 428 and a power generating device 430. In some embodiments said power generating device 430 is an electric generator. However, in other embodiments said power generating device 430 may be a frost fan, water pump, propeller, or any other power producing mechanical device.

Said solar energy collector 120 communicates with said storage tank 122 by means of a duct 124. A valve 132 controls the heat flow from said solar energy collector 120 to said storage tank 122. Said valve 132 is opened during the solar energy collection phase of operations so that heat from the sun can pass from said solar energy collector 120 through said duct 124 and into said storage tank 122 by means of thermal conduction and convection. Said valve 132 is closed during the power generation phase of operations.

A dual axis mount 134 positions the centerline axis of said solar energy collector 120 so that it always points to the sun as the sun transits across the sky.

Said Stirling engine 428 is a closed-cycle heat engine that has been in use since the 19$^{th}$ century. The working fluid of said Stirling engine 428 is permanently contained within its interior and is not combusted during the process of power creation. In some embodiments the working fluid is a gas such as hydrogen or helium that has the property of high thermal conductivity. However, in other embodiments the working fluid may be of any gaseous element, molecule or collection of molecules such as air. Said Stirling engine 428 has a hot side, a cold side, and an internal heat exchanger and thermal store known as a regenerator. A piston (or pistons) move the gas to the correct places within the engine, at the correct time in the cycle, and extract mechanical power from it.

In some embodiments the cold side of said Stirling engine 428 is cooled by conducting its heat into the ambient atmosphere by means of cooling fins. However, in other embodiments cooling mediums such as cold water provided by a nearby river, lake or ocean have been used.

In this embodiment the hot side of said Stirling engine 428 is heated by pumping hot working gas through a heat exchanger. An example of a Stirling engine working with this type of heat exchanger is given in NASA publication NASA CR-175106 "Automotive Stirling Engine: Mod II Design Report". Thermal energy in the NASA Stirling engine example is provided by burning fossil fuels. The thermal energy in this embodiment is provided by solar energy.

The working gas of the solar energy collector and power generation system 100 is not mixed with the working fluid of said Stirling engine 428 but is contained in a separate system. The working gas of said solar energy collector and power generation system 100 is not combusted during the process of power creation and will never need to be replenished except for what is lost to leakage. In some embodiments the working gas has the property of high thermal conductivity such as hydrogen or helium. However, in other embodiments the working gas may be of any gaseous element, molecule or collection of molecules such as air.

The hot gas line 136 carries solar heated working gas from either side of said storage tank 122 to hot gas valve 138 which directs the hot working gas through a hot gas line 436, through said pump 426 and to the hot side of said Stirling engine 428. Said Stirling engine 428 uses the energy of the solar heated working gas to drive said power generating device 430. The working gas, now depleted of heat and become cold, passes into a cold gas line 440. A cold gas valve 142 directs the cold gas flow through cold gas line 140 and to either side of said storage tank 122.

In some embodiments the valves are opened and closed by means of a solenoid, and this is noted in the accompanying figures with a letter "S" enclosed in a circle. However, in other embodiments there are other suitable means for opening and closing the valves.

Figure 2:
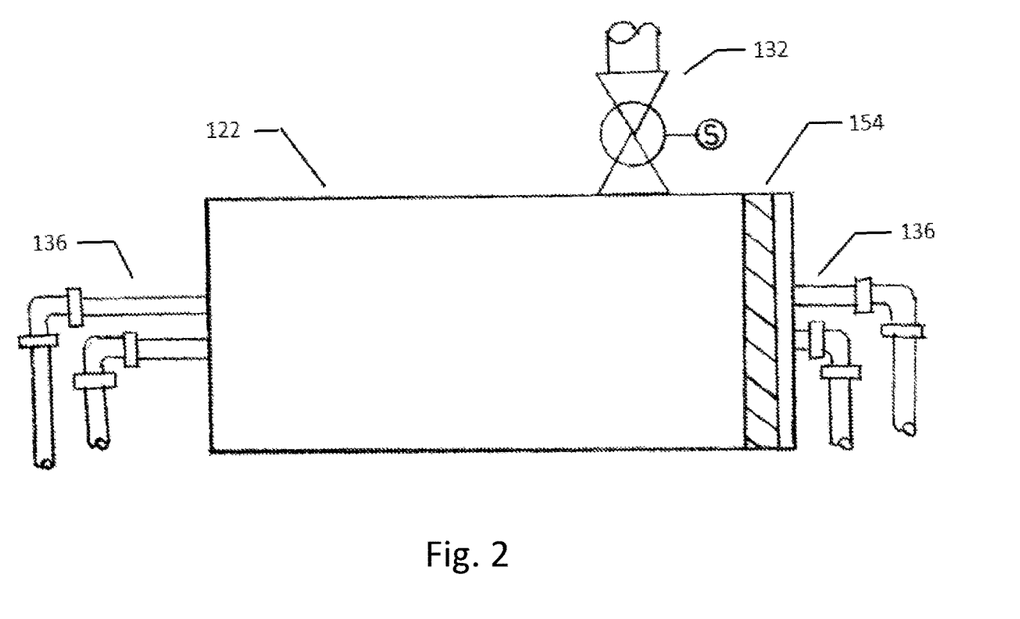
FIG. 2 is a side cutaway view of the storage tank and its thermal barrier.

Referring now to FIG. 2 a cutaway of said storage tank 122 and the thermal barrier 154 is shown. In some embodiments said storage tank has a circular cross section and is made from high temperature structural steel. However, in other embodiments it can have different cross sections such as oval, rectangular and hexangular and be made of different high temperature materials such as carbon phenolic. Said thermal barrier 154 is made from a lightweight, heat resistant, insulating material that fits into the interior dimensions of said storage tank 122 and prevents the hot working gas from mixing with the cold working gas. Said thermal barrier 154 translates from one side of said storage tank 122 to the other like a piston in a cylinder. Said thermal barrier 154 is pushed by the pressure differential created by pumping the hot working gas out of said storage tank 122 on the one side and pumping cold working gas into said storage tank 122 on the other.

The principal of solar energy heat collection by means of opposing parabolic mirrors is detailed in the cutaway drawings of FIG. 3. A cutaway of said solar energy collector 120 is shown in FIG. 3a and features a chamber 44. In some embodiments said chamber 44 has a circular cross section and is made from high temperature structural steel. However, in other embodiments it can have different cross sections such as oval, rectangular, or hexangular, and be made of different high temperature materials such as carbon phenolic. Also featured are an outer transparent pane 46, an inner transparent pane 48, and a large parabolic mirror 50. In some embodiments dry inert gas is sealed between two transparent panes so as to form a thermal insulation barrier. However, in other embodiments only one pane with exceptionally high insulation properties would be required.

Figure 3A:
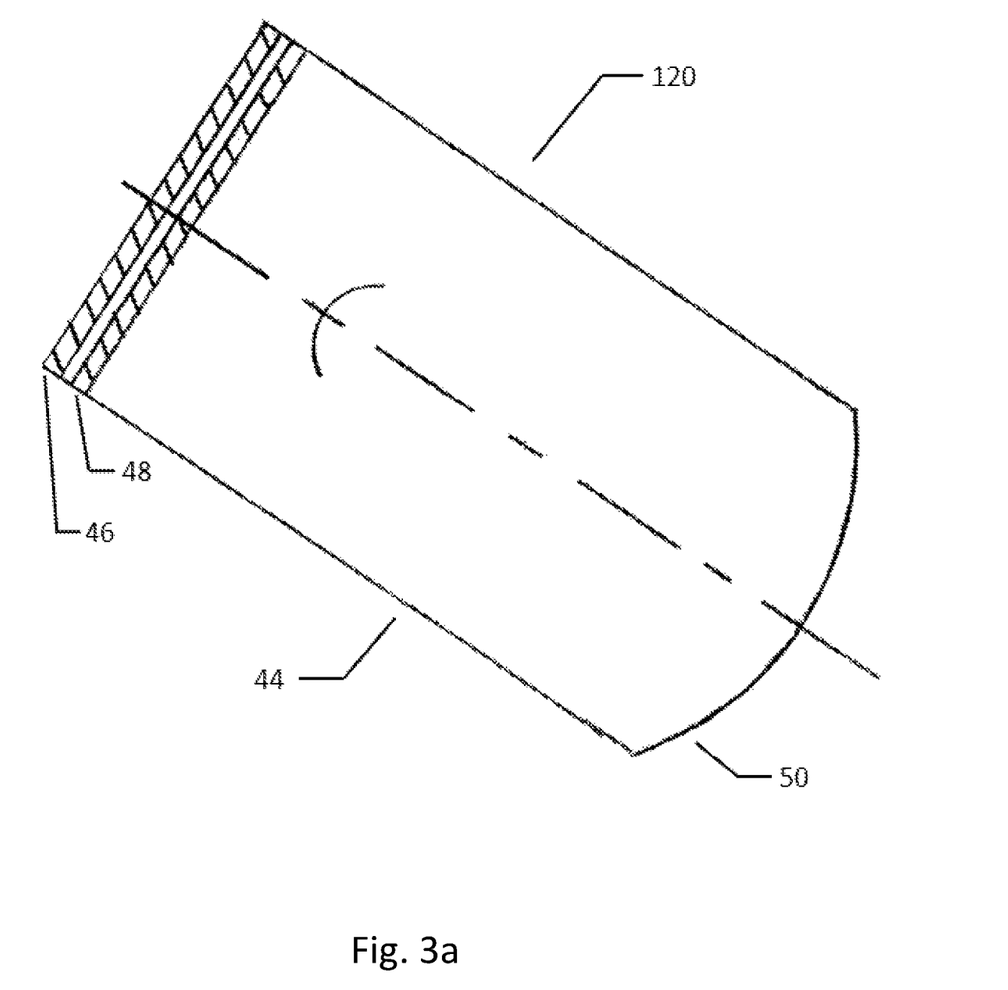
FIGS. 3a through 3d show a side cutaway view of the solar energy collector featuring the opposing parabolic mirrors that trap and hold the incoming solar energy.

Said transparent panes 46 and 48 are situated at the end of said chamber 44 facing the sun. In some embodiments said transparent panes 46 and 48 are made from low reflective, high optic, heat resistant glass such as Corning HFPS 8655 ArF, manufactured by Corning Incorporated, Corning, New York. However, in other embodiments other kinds of transparent solids are available and would be well suited to the task. Said transparent panes 46 and 48 are sealed to said chamber 44 to prevent the working gas contained inside from escaping. A dry, inert gas is sealed between said transparent panes 46 and 48 and acts as an insulator to prevent heat from escaping.

Figure 3B:
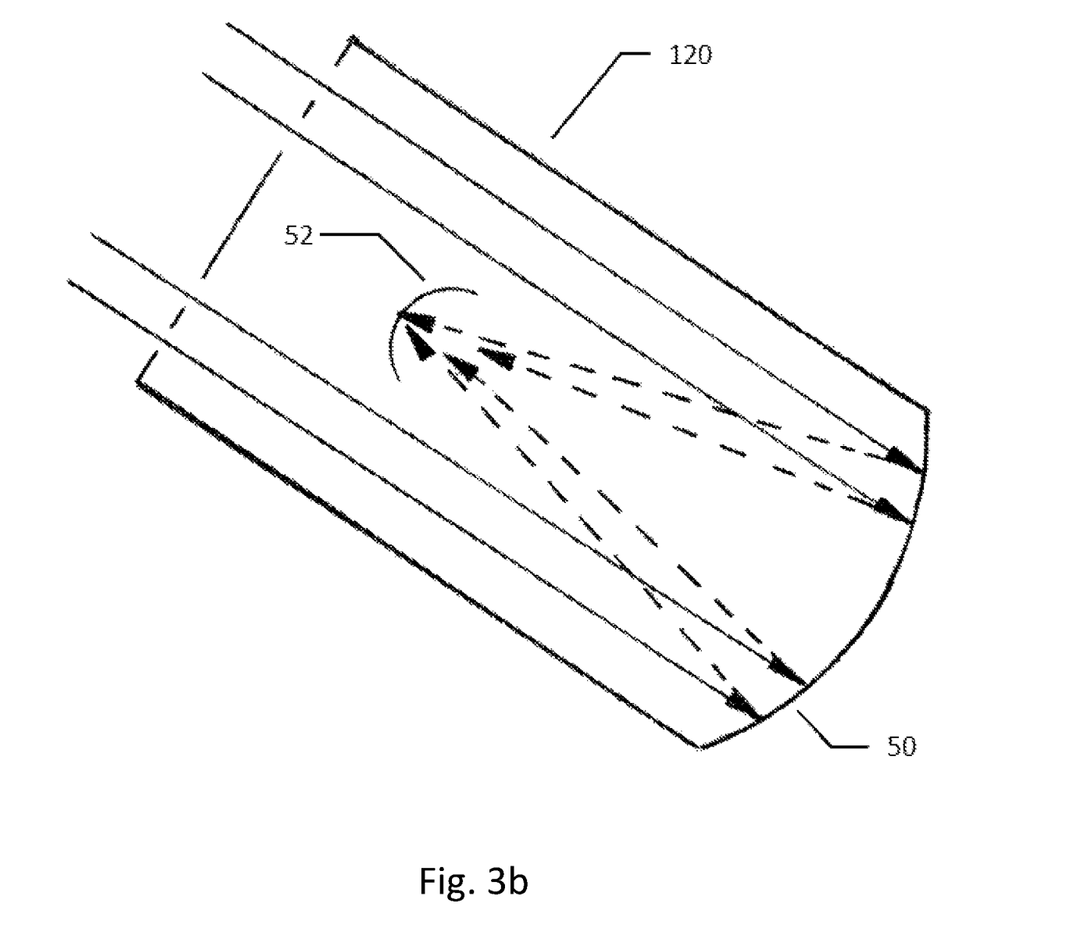
Figure 3C:
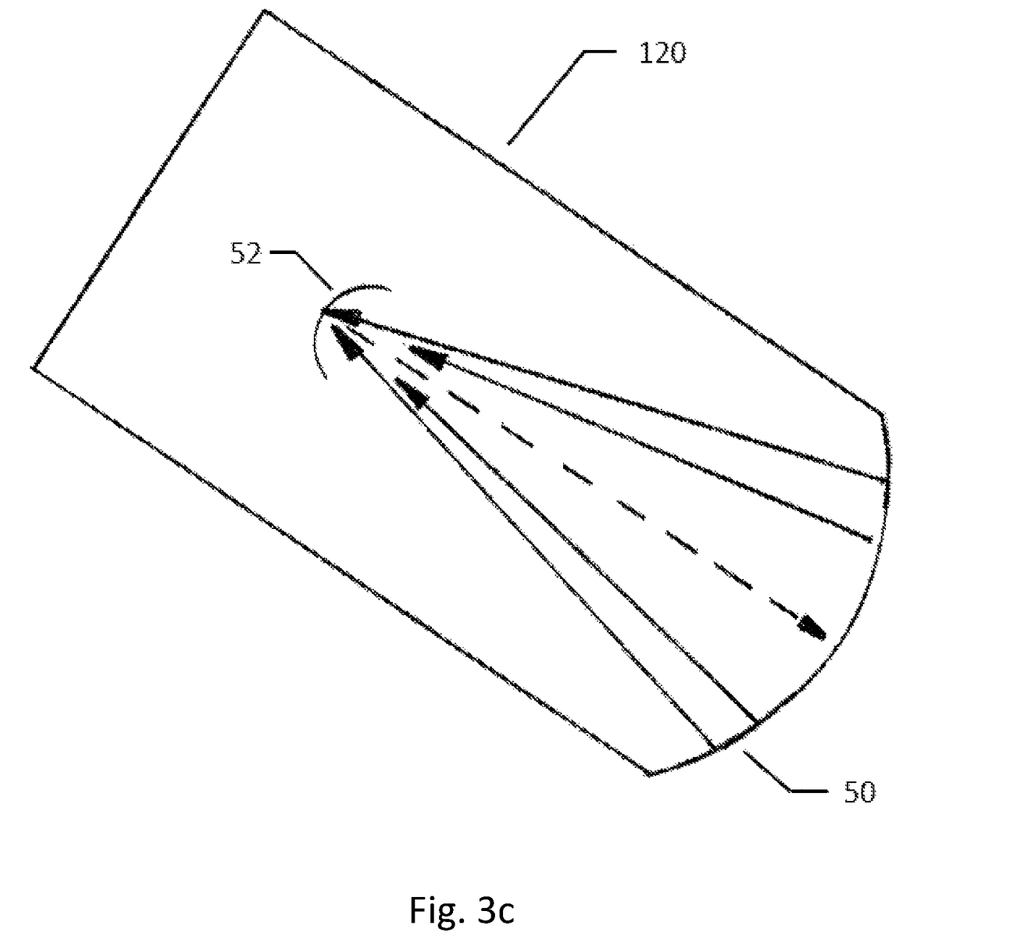
Figure 3D:
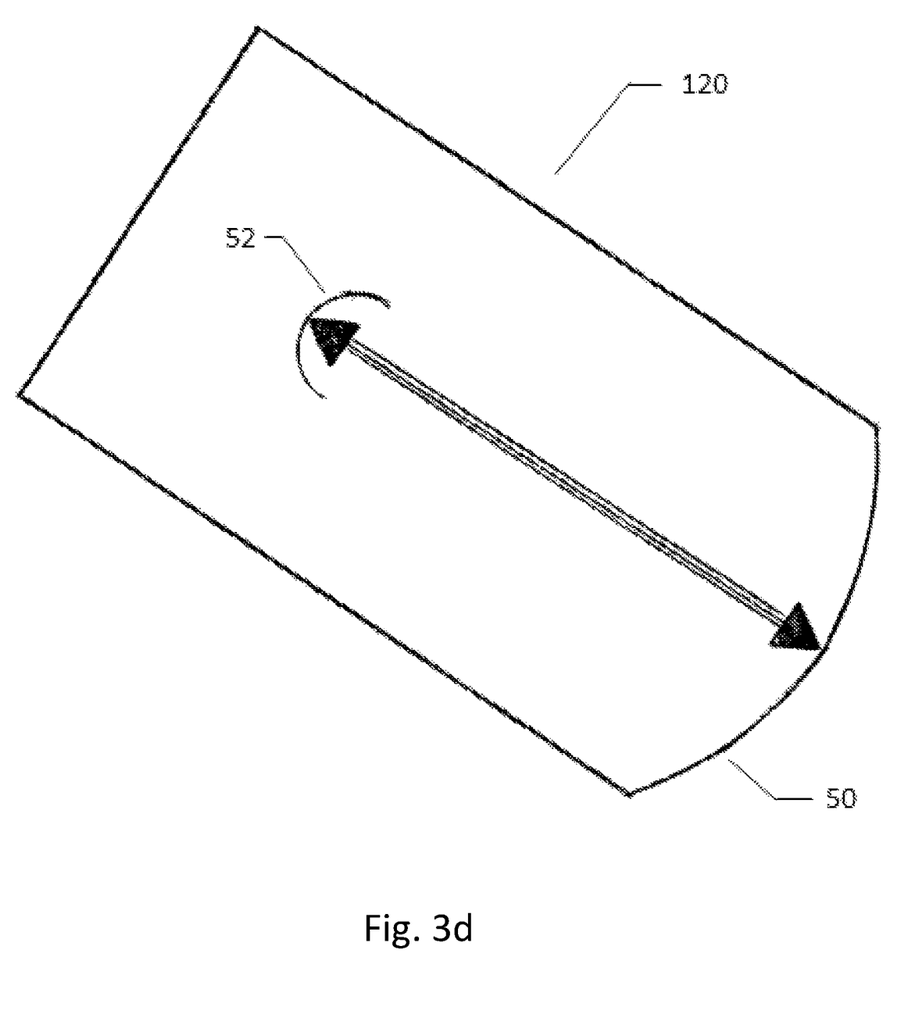

At the opposing end of said solar energy collector 120 is located said large parabolic mirror 50 which fits the entirety of the aft end of said chamber 44. As is shown in FIG. 3b, the sunlight collected by said large parabolic mirror 50 is reflected and focused onto the center of small parabolic mirror 52 which is situated on the centerline of said chamber 44 directly opposite said large parabolic mirror 50. As is shown in FIG. 3c, that light is in turn reflected from said small parabolic mirror 52 back into the center of said large parabolic mirror 50. As is seen in FIG. 3d, the final effect is that solar energy is trapped and reflected back and forth between the large parabolic mirror 50 and small parabolic mirror 52 until finally absorbed by the working gas contained in said solar energy collector 120.

Referring now to FIG. 4 there is shown a system overview of a solar energy collector and power generation system 400 according to an illustrative embodiment. The solar energy collector and power generation system 400 develops power around the clock, 24 hours every day. The solar energy collector and power generation system 400 is comprised of said solar energy collector and power generation system 100 and identical solar energy collector and power generation systems 200 and 300, with the exception that only one Stirling engine 428, one pump 426, and one power generating device 430 are required. To complete the operations of said solar energy collector and power generation system 400 said hot gas line 436, said cold gas line 440, a cold gas valve 442, a cold gas valve 444, and a 4-way valve 446 are required.

The 24 hour operation of said power generation system 400 is detailed in FIGS. 4a through 4g. The ports of the valves that are closed to gas flow are shown blackened, the ports of the valves that are open to gas flow are shown in white. The direction of working gas flow through said cold gas lines and hot gas lines is shown by arrows. The direction of movement of said thermal barriers 154, 254 and 354 is likewise shown by an arrow.

Figure 4A:
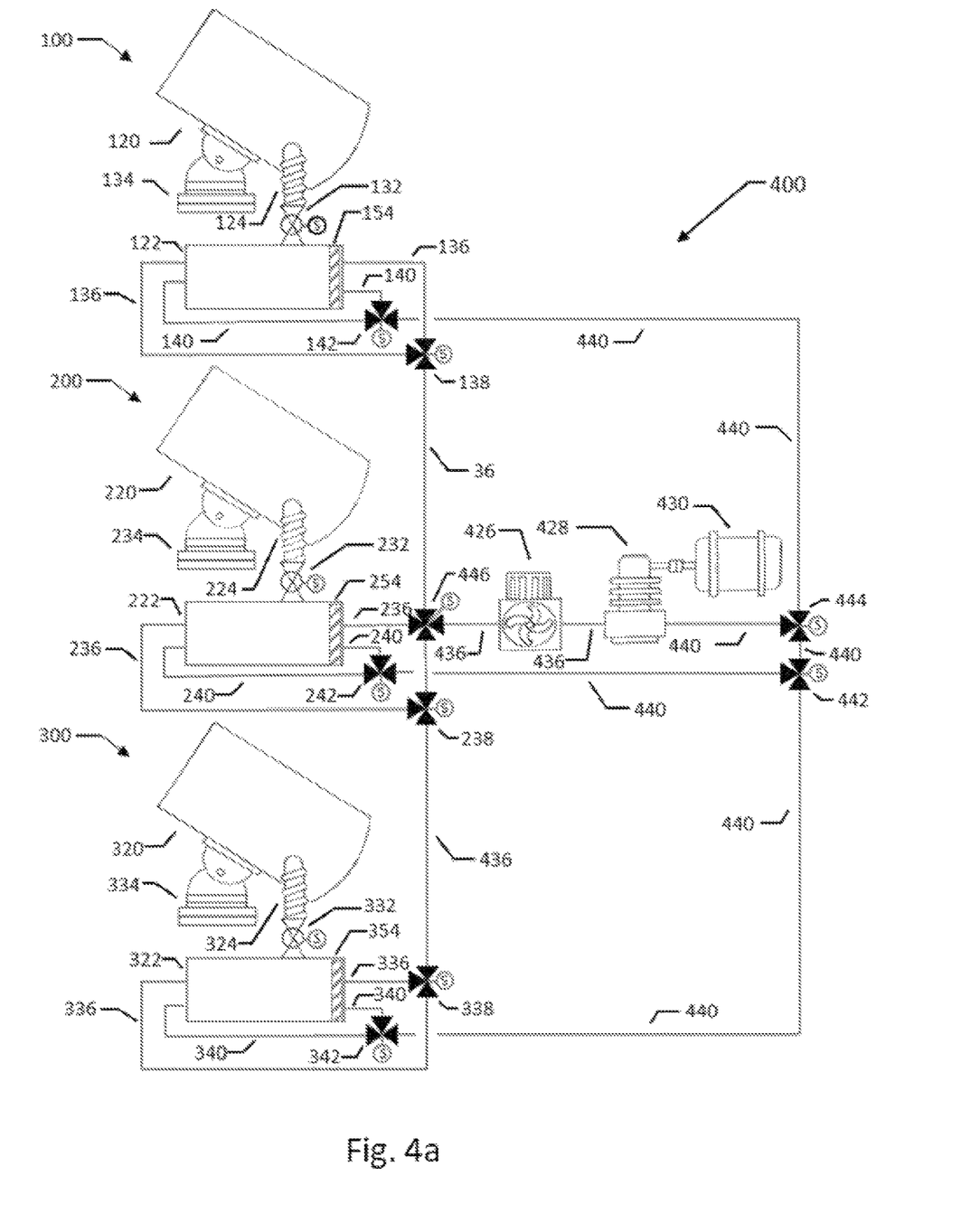
FIGS. 4a through 4g are schematics of multiple Solar Energy Collectors and Power Generation Systems working in concert.

On Day 0 a small amount of power from outside said power generation system 400 will be required to direct the solar energy collectors 120, 220 and 320 to follow the sun in its arc across the sky. On Night 1 a small amount of power from outside said power generation system 400 will be required to start said pump and open said valves. From then on the power requirement of said solar energy collector and power generation system 400 will be self-sustaining.

FIG. 4a details the operations of Day 0. No working gas is moved and no power is generated on Day 0. All three systems collect solar heat while solar energy collectors 120, 220 and 320 track the sun across the sky. Said thermal barrier 154 is positioned to the right side of storage tank 122, as are thermal barriers 254 and 354 positioned to the right side of storage tanks 222 and 322 respectively. Said valve 132 is open to allow solar heat to transfer down into said storage tank 122, as are valves 232 and 332 opened to allow solar heat to transfer down into storage tanks 222 and 322 respectively. All other valves are fully closed. At the end of Day 0 all three of said solar energy collector and power generation systems 100, 200 and 300 are fully charged with hot working gas.

Figure 4B:
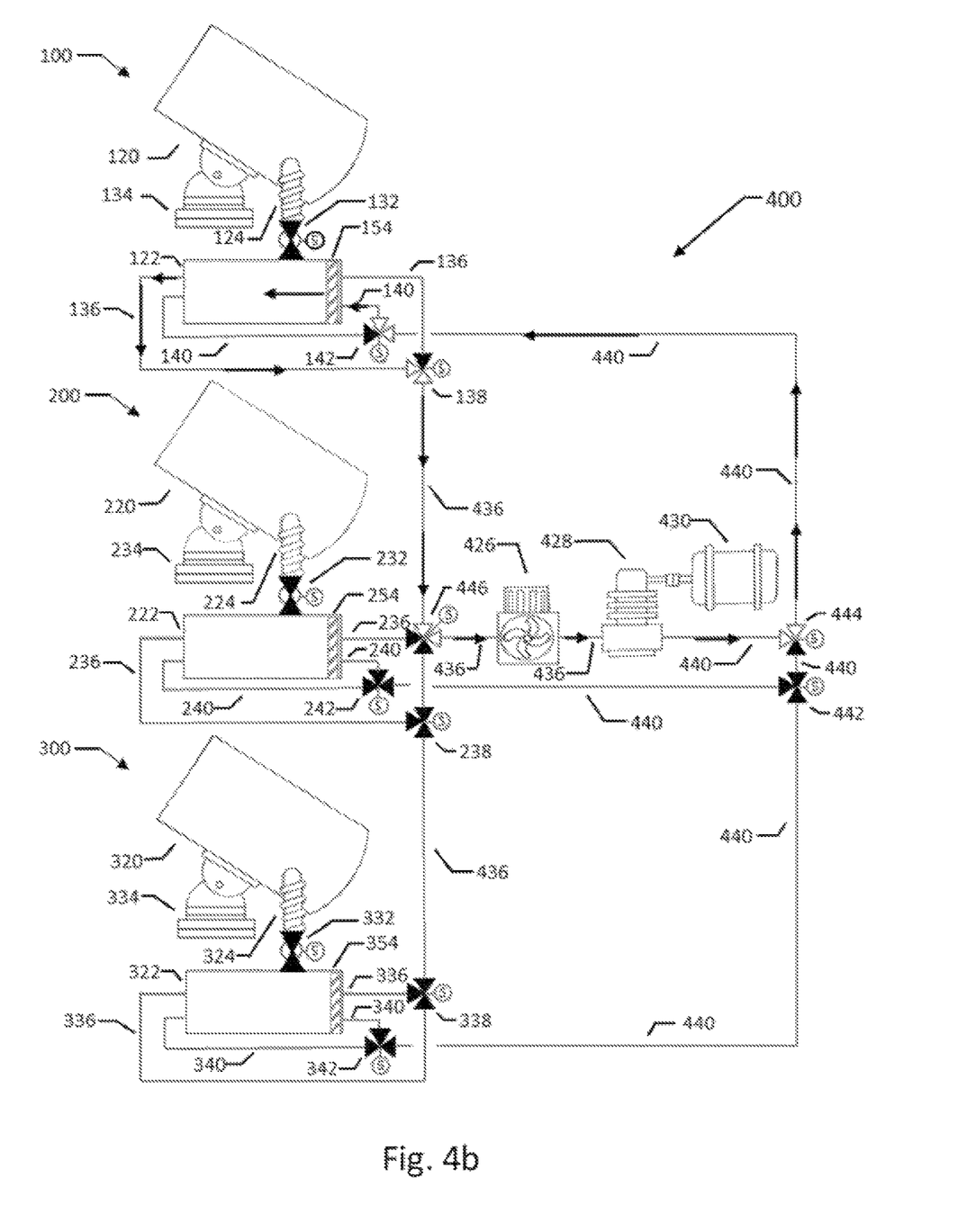

FIG. 4b details the operations of Night 1. At sunset hot gas valve 138 and 4-way valve 446 are opened to direct hot working gas from the left side of said storage tank 122 through said pump 426 to said Stirling engine 428 via hot gas lines 136 and 436. The hot working gas is pumped through the heat exchanger of said Stirling engine 428 and, depleted of heat, enters cold gas line 440. Said cold gas valves 444 and 142 are opened to direct cold working gas back into the right side of said storage tank 122 via said cold gas lines 440 and 140. Said thermal barrier 154, driven by the pressure differential created by hot working gas leaving the left side of said storage tank 122 and cold working gas entering the right side of said storage tank 122, translates from right to left. All other valves are closed for the duration of Night 1.

Figure 4C:
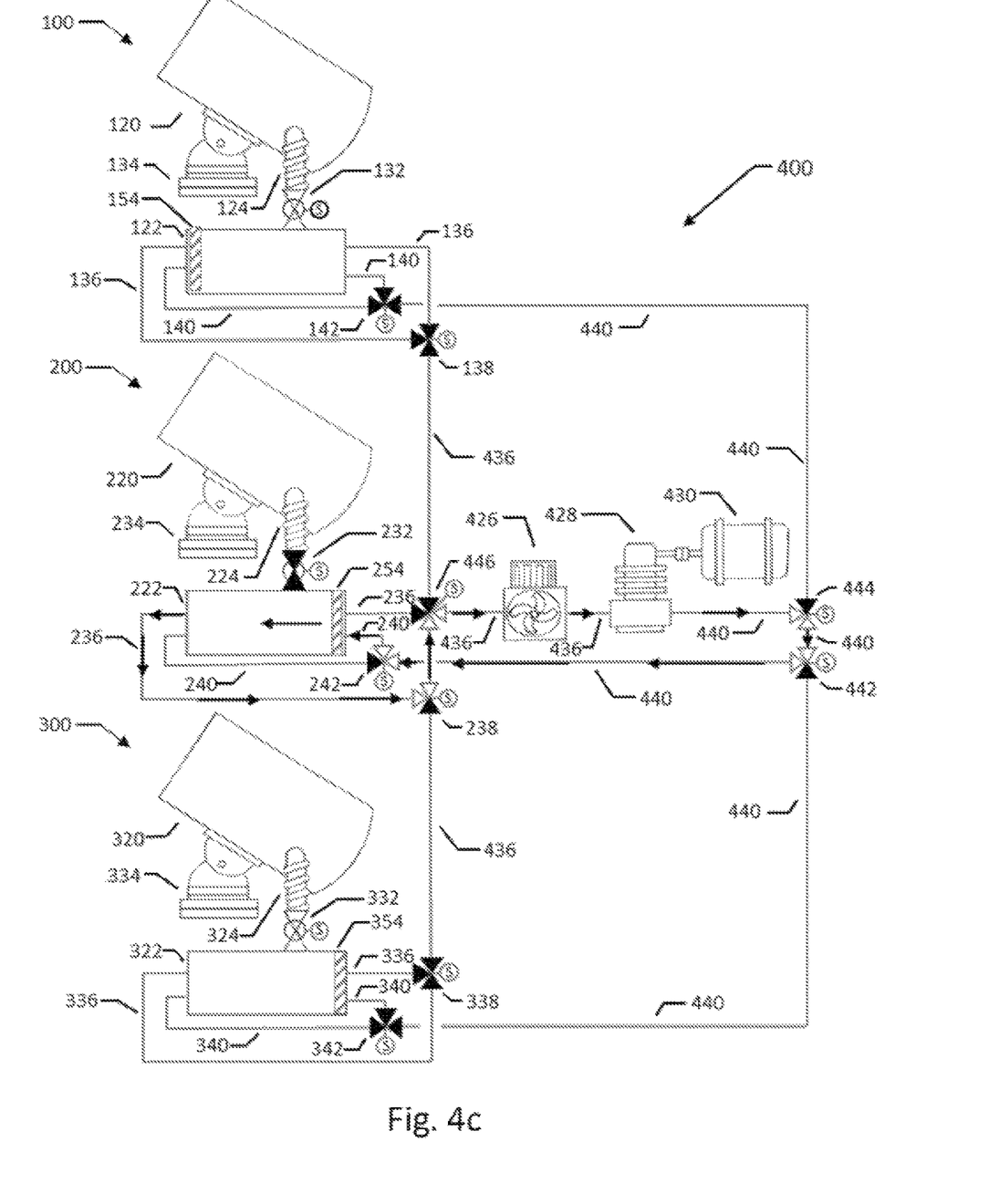

FIG. 4c details the operations of Day 1. Beginning at sunrise, said solar energy collectors 120 and 320 track the sun across the sky. Said valves 132 and 332 are opened so that solar heat can be transferred into said storage tanks 122 and 322 respectively. Said hot gas valve 238 and said 4-way valve 446 are opened to direct hot working gas from the left side of said storage tank 222 to said pump 426 and said Stirling engine 428 via hot gas lines 236 and 436. Said cold gas valves 444, 442 and 242 are opened to direct cold working gas back into the right side of storage tank 222 via cold gas lines 440 and 240. Said thermal barrier 254 translates from the right side to the left side of storage tank 222. All other valves are closed for the duration of Day 1.

Figure 4D:
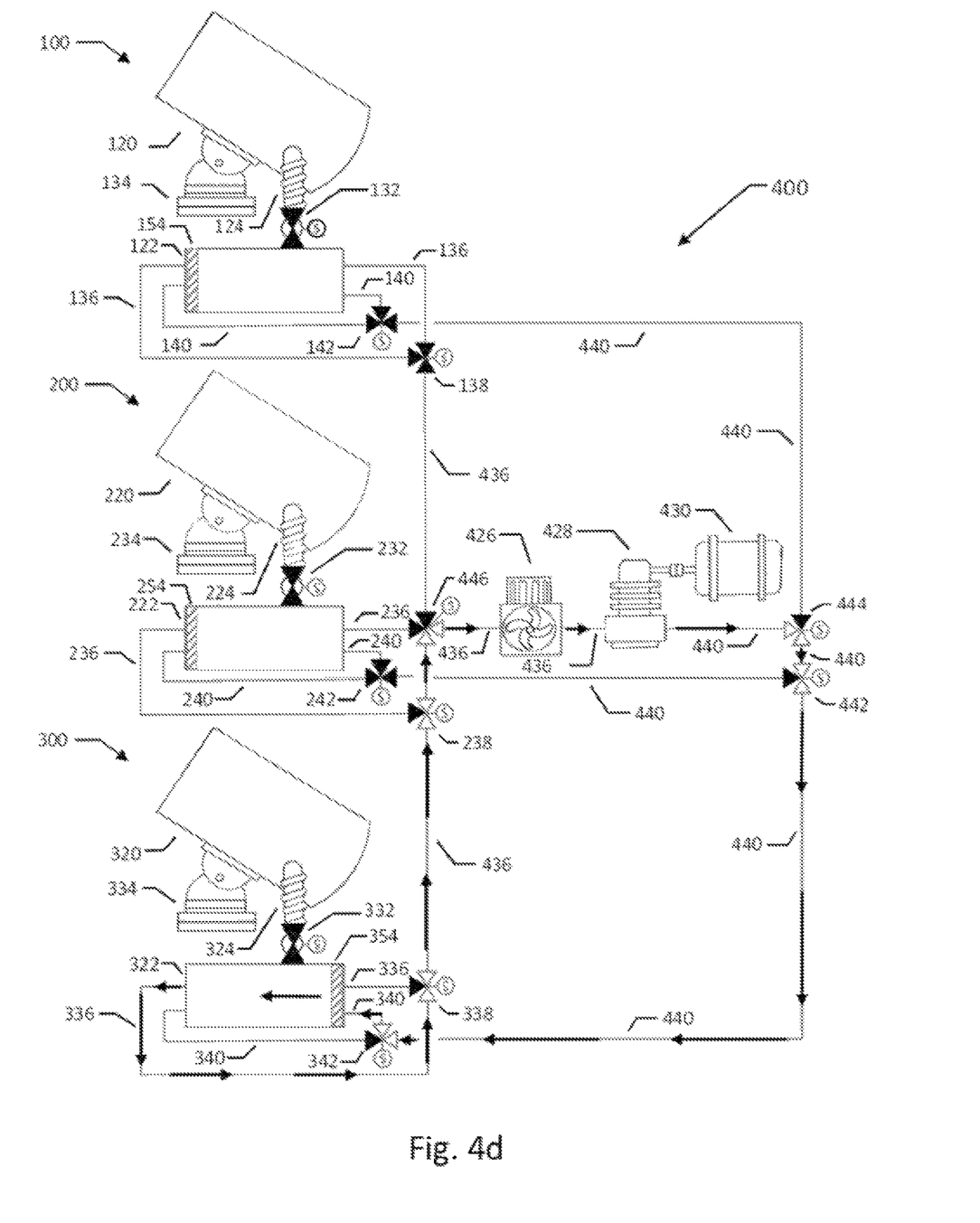

FIG. 4d details the operations of Night 2. At sunset hot gas valves 338 and 238 and 4-way valve 446 are opened to direct hot working gas from the left side of said storage tank 322 to said pump 426 and said Stirling engine 428 via said hot gas lines 336 and 436. The hot working gas is pumped through the heat exchanger of said Stirling engine 428 and enters cold gas line 440. Cold gas valves 444, 442 and 342 are opened to direct cold working gas back into the right side of said storage tank 322 via cold gas lines 440 and 340. Said thermal barrier 354 translates from right to left. All other valves are closed for the duration of Night 2.

Figure 4E:
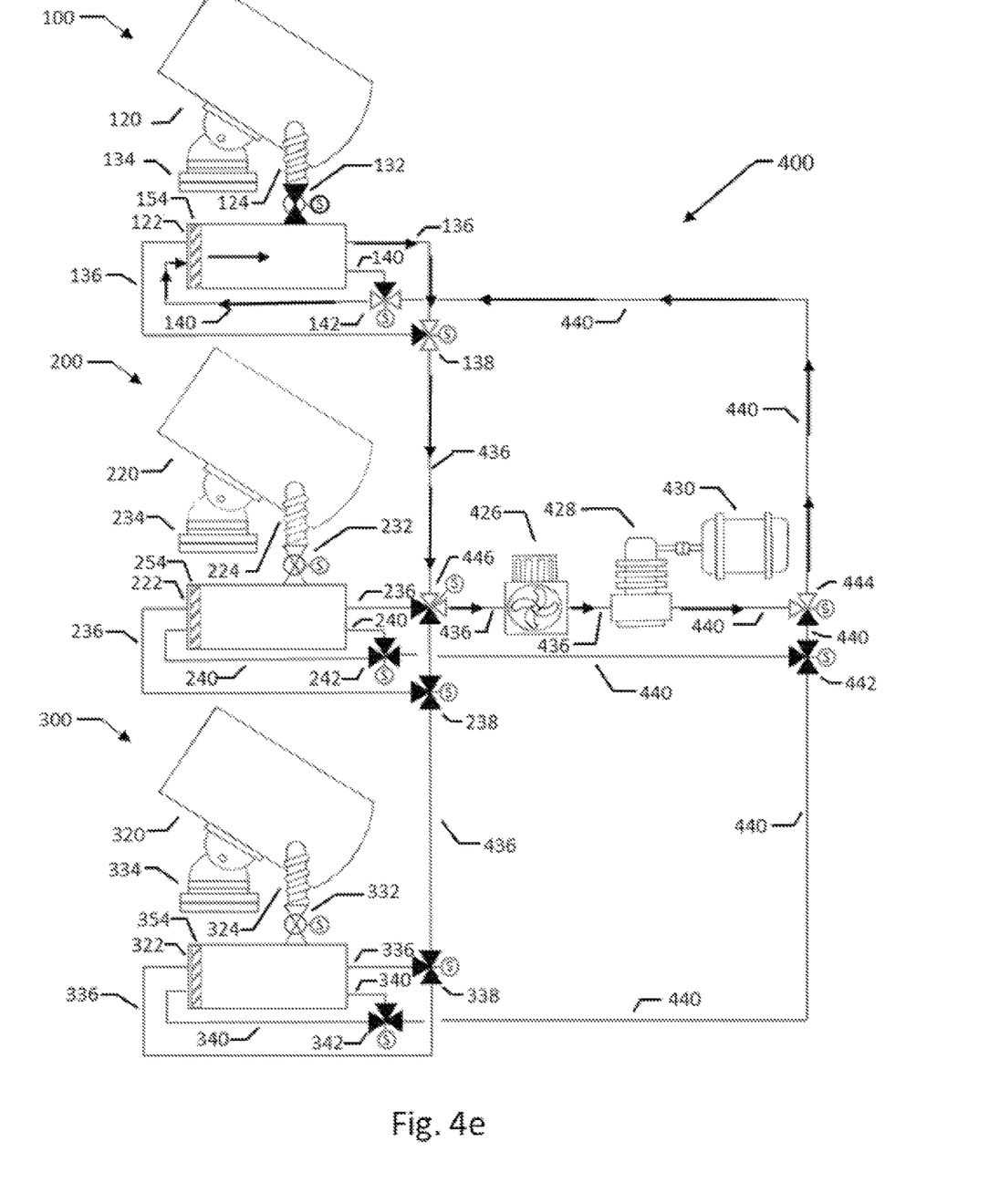

FIG. 4e details the operations of Day 2. Beginning at sunrise, solar energy collectors 220 and 320 track the sun across the sky. Valves 232 and 332 are opened so that solar heat can be transferred into storage tanks 222 and 322. Hot gas valve 138 and 4-way valve 446 are opened to direct hot working gas from the right side of storage tank 122 to pump 426 and Stirling engine 428 via hot gas lines 136 and 436. Cold gas valves 444 and 142 are opened to direct cold working gas back into the left side of storage tank 122 via cold gas lines 440 and 140. Said thermal barrier 154 translates from the left side to the right side of storage tank 122. All other valves are closed for the duration of Day 2.

Figure 4F:
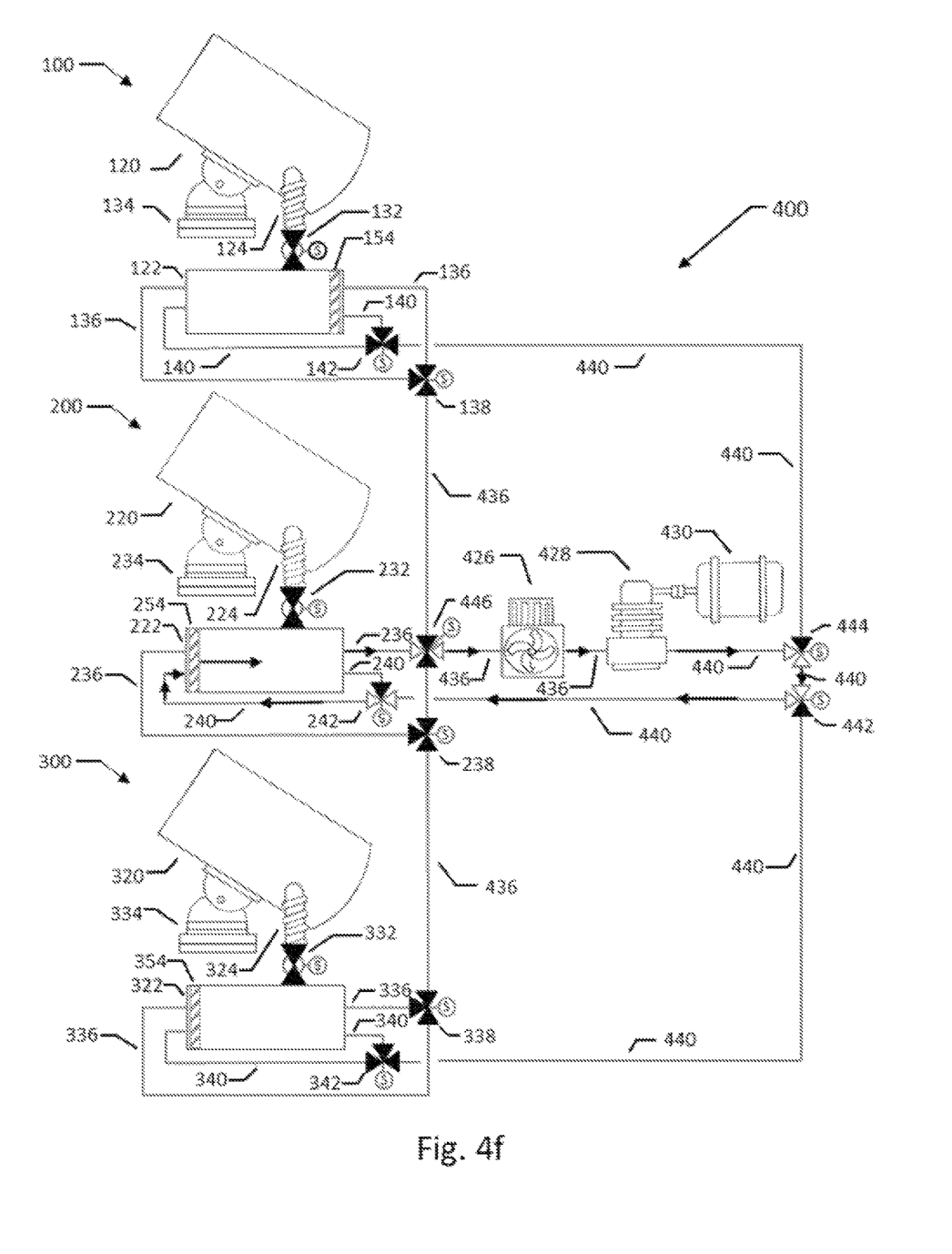

FIG. 4f details the operations of Night 3. At sunset 4-way valve 446 is opened to direct hot working gas from the right side of storage tank 222 to pump 426 and Stirling engine 428 via hot gas lines 236 and 436. The hot working gas passes through the Stirling engine's heat exchanger and enters cold gas line 440. Cold gas valves 444, 442 and 242 are opened to direct cold working gas back into the left side of storage tank 222 via cold gas lines 440 and 240. Thermal barrier 254 translates from left to right. All other valves are closed for the duration of Night 3.

Figure 4G:
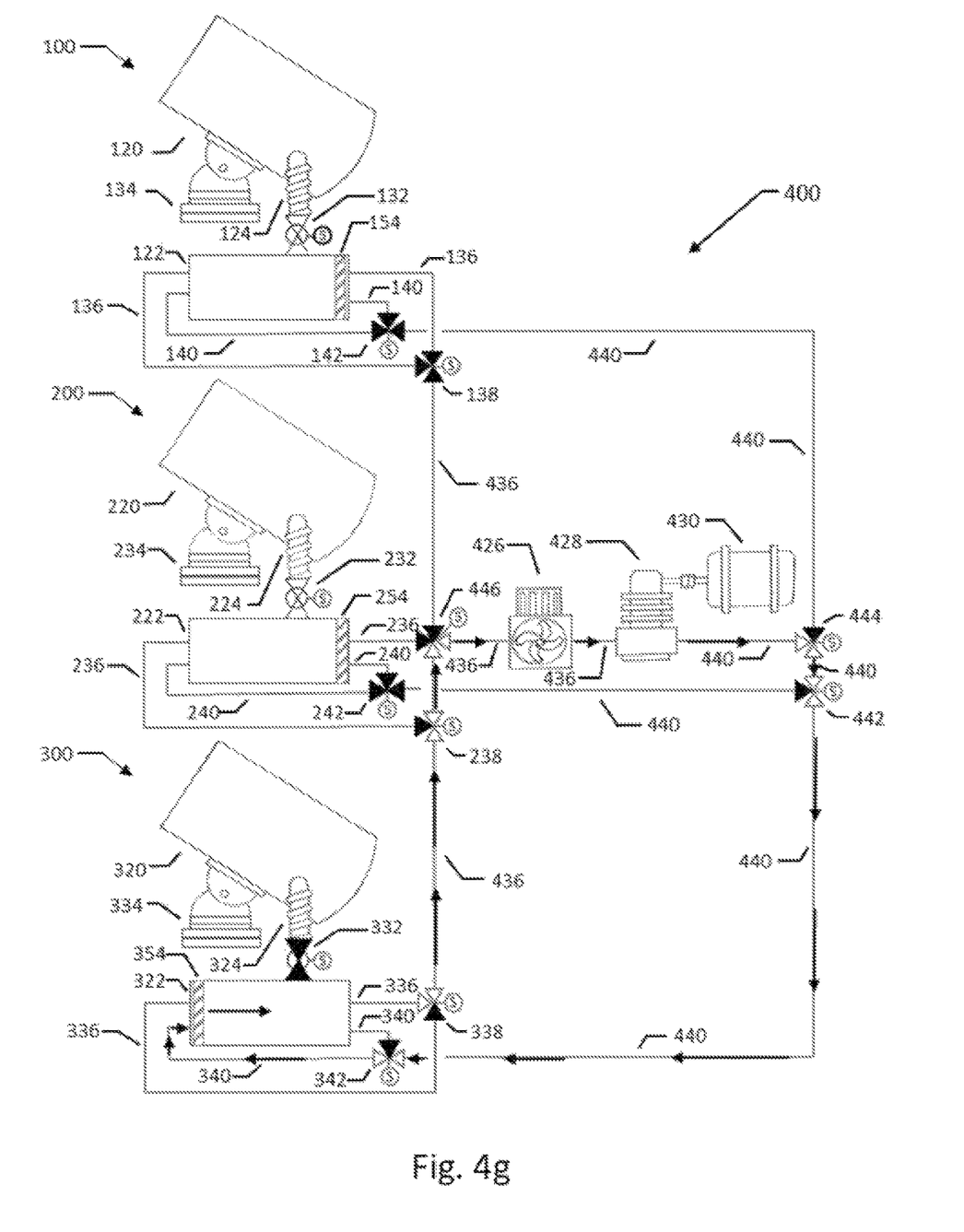

FIG. 4g details the operations of Day 3. Beginning at sunrise, solar energy collectors 120 and 220 track the sun across the sky. Valves 132 and 232 are opened so that solar heat can be transferred into storage tanks 122 and 222. Hot gas valves 338 and 238 and 4-way valve 446 are opened to direct hot working gas from the right side of storage tank 322 to the pump 426 and Stirling engine 428 via hot gas lines 336 and 436. Said cold gas valves 444, 442 and 342 are opened to direct cold working gas back into the left side of storage tank 322 via cold gas lines 440 and 340. Thermal barrier 354 translates from the left side to right side of storage tank 322. All other valves are closed for the duration of Day 3.

At this point the cycle restarts with the setup shown in FIG. 4b and continues in sequence through to FIG. 4g. The cycle repeats over and over again and the Stirling Engine runs continuously, day and night, for as long as the operator would like.

All of the elements of the solar energy heat collector and power generation system 400, with the exception of the transparent panes 46 and 48, and the cooling fins of Stirling engine 428, are insulated to prevent the heat contained within from escaping. All of the joints of the solar energy heat collector and power generation system 400 are sealed to prevent the working gas from escaping.

Figure 5:
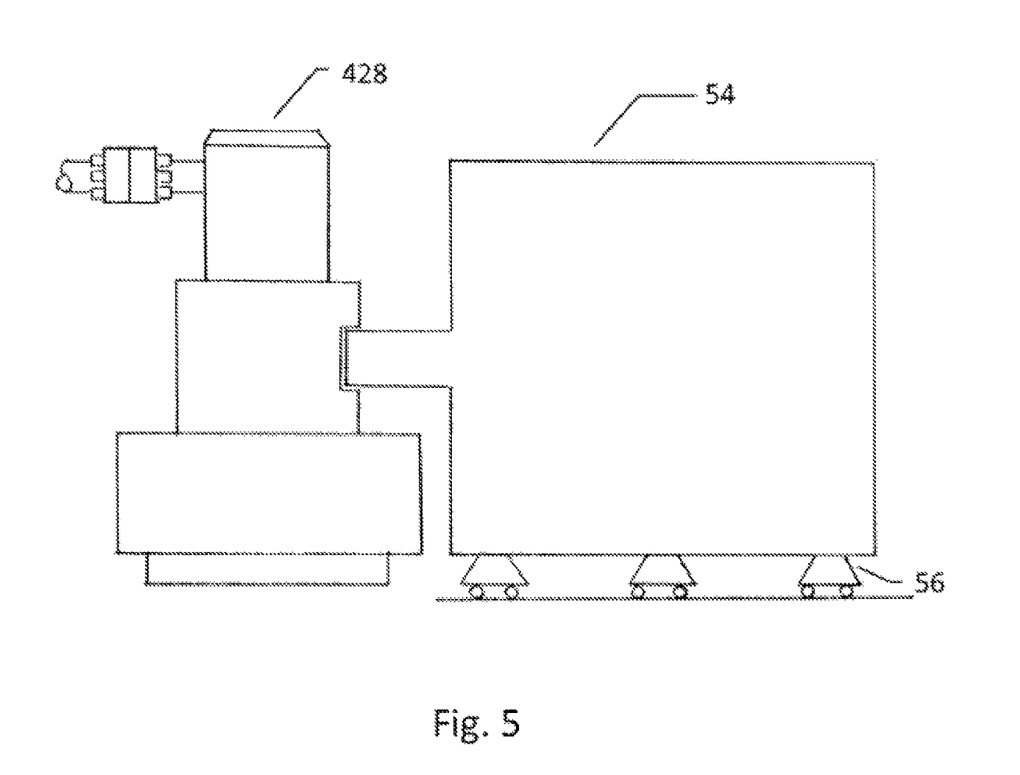
FIG. 5 is a side view of a cold block in direct contact with the cold side of the Stirling engine.

Referring now to FIG. 5 there is shown an alternative method of drawing heat from the cold side of said Stirling engine 428 according to an illustrative embodiment. A cold block 54 is placed in direct contact with the cold section of said Stirling engine 428 to replace or augment the cooling fins. In one embodiment said cold block 54 can be left out in the ambient atmosphere overnight to lower its temperature. In another embodiment said cold block 54 can be immersed in cold water to lower its temperature. In yet another embodiment said cold block 54 can be left outside during winter months to lower its temperature. This can be done in situ, or in very cold environments such as mountain regions or winter environments. Said cold block 54 is then placed in direct contact with the cold side of the Stirling engine 428 to reduce the temperature of the cold chamber by thermal conductivity.

In some embodiments the composition of said cold block 54 is a material that has the property of high thermal conductivity such as aluminum. However, in other embodiments the composition of said cold block 54 may be of any other suitable material.

In some embodiments said cold block 54 can be mounted on wheeled trucks 56 for ease of sliding into contact with said Stirling engine 428. However, in other embodiments it can have different apparatus and methods for maneuver into contact.

Except for the part in contact with Stirling engine 428, said cold block 54 is insulated during operating hours to prevent warming by sunlight and the ambient atmosphere.

I claim:

1. A solar energy collector and power generation system comprising:
   a. a solar energy collector to capture sunlight in a pair of opposing parabolic mirrors,
   b. a working gas to carry heat energy provided by said sunlight,
   c. a storage tank to store said working gas,
   d. a duct to provide a means of communication between said solar energy collector and said storage tank,
   e. a Stirling engine to convert the heat energy of said working gas into mechanical work,
   f. a power generating device coupled to said Stirling engine,
   g. a system of valves and gas lines to direct hot working gas from said storage tank to said Stirling engine,
   h. a system of valves and gas lines to direct cold working gas from said Stirling engine back to said storage tank,
   i. a pump to propel said working gas through said power generation system,
   j. a 2-axis mount for said solar energy collector, whereby said solar energy collector and power generation system captures and stores solar energy, then converts said solar energy into mechanical and electrical power,
   wherein the solar energy collector further includes:
      i. a chamber,
      ii. a transparent pane located at a sun facing end of said chamber,
      iii. a large parabolic mirror located at an opposing end of said chamber,
      iv. a small parabolic mirror sited in the interior of said chamber,
      v. said large and small parabolic mirrors situated so that they both reflect captured sunlight into the center point of each,
      vi. said chamber constructed of materials capable of supporting said transparent pane, said large parabolic mirror, and said small parabolic mirror,
      vii. said chamber filled with the working gas,
   whereby said solar energy collector traps the majority of incoming sunlight and, through the processes of thermal radiation, heat conduction, and heat convection, converts said sunlight into useable heat energy.

2. The solar energy collector and power generation system of claim 1, wherein said 2-axis mount points said solar energy collector to the sun as the sun moves in its daily arc across the sky.

3. The solar energy collector and power generation system of claim 1 further including a valve that controls the flow of working gas from said solar energy collector to said storage tank.

4. The solar energy collector and power generation system of claim 1, wherein the duct includes the properties of flexibility and stretchability so that the duct may remain connected to the solar collector as the collector pivots about its axes.

5. The solar energy collector and power generation system of claim 1, wherein multiple transparent panes are located at the sun facing end of said chamber.

6. The solar energy collector and power generation system of claim 5 wherein a dry inert gas is sealed between the panes so as to form a thermal insulation barrier.

7. The solar energy collector and power generation system of claim 1, wherein said large parabolic mirror is sized to reflect the majority of sunlight that enters said chamber.

8. The solar energy collector and power generation system of claim 1, wherein a thermal barrier is located in the interior of said storage tank, said thermal barrier forming a snug fit with the interior wall of said storage tank so that it may translate freely through the length of the tank and at the same time prevent mixing of hot working gas on the one side with cold working gas on the other side.

9. The solar energy collector and power generation system of claim 8 wherein said barrier is comprised of insulating materials.

10. The solar energy collector and power generation system of claim 1 wherein said system is comprised of materials capable of functioning at high temperatures.

11. The solar energy collector and power generation system of claim 1 wherein high temperature components are insulated.

12. The solar energy collector and power generation system of claim 1 wherein all seams and joints are sealed so as to minimize working gas leakage.

13. The solar energy collector and power generation system of claim 1 further including a plurality of solar energy collectors, storage tanks, ducts, valves, gas lines, Stirling engines, pumps and power generating devices.

14. The solar energy collector and power generation system of claim 1 further including a cold block, comprised of high thermal conductivity materials, to be chilled to a low temperature in cold ambient air or water, then placed in physical contact with a cold section of the Stirling engine in order to draw off heat.

15. The solar energy collector and power generation system of claim 14, wherein all of the cold block's exterior surfaces are insulated except for that part in contact with the Stirling engine.

* * * * *